United States Patent
Berger et al.

(10) Patent No.: US 8,356,523 B2
(45) Date of Patent: Jan. 22, 2013

(54) ULTRASONIC SENSOR OF A MEASURING SYSTEM FOR DETERMINING AND/OR MONITORING FLOW OF A MEASURED MEDIUM THROUGH A MEASURING TUBE

(75) Inventors: Andreas Berger, Hasel-Glashutten (DE); Achim Wiest, Weil am Rhein (DE)

(73) Assignee: Endress + Hauser Flowtec AG, Kagenstr., Reinach (CH)

( * ) Notice: Subject to any disclaimer, the term of this patent is extended or adjusted under 35 U.S.C. 154(b) by 177 days.

(21) Appl. No.: 13/055,657

(22) PCT Filed: Jul. 7, 2009

(86) PCT No.: PCT/EP2009/058539
§ 371 (c)(1),
(2), (4) Date: Jan. 24, 2011

(87) PCT Pub. No.: WO2010/009974
PCT Pub. Date: Jan. 28, 2010

(65) Prior Publication Data
US 2011/0120231 A1 May 26, 2011

(30) Foreign Application Priority Data
Jul. 23, 2008 (DE) .......................... 10 2008 034 412

(51) Int. Cl.
*G01F 1/84* (2006.01)
(52) U.S. Cl. .................................................. 73/861.357
(58) Field of Classification Search ............ 73/861.355–861.357, 861.18
See application file for complete search history.

(56) References Cited

U.S. PATENT DOCUMENTS

| 5,131,278 | A | 7/1992 | Baumoel | |
| 6,360,614 | B1* | 3/2002 | Drahm et al. | 73/861.357 |
| 6,397,683 | B1 | 6/2002 | Hagenmeyer | |
| 6,487,917 | B1* | 12/2002 | Van Cleve et al. | 73/861.357 |
| 6,880,410 | B2* | 4/2005 | Drahm et al. | 73/861.357 |

FOREIGN PATENT DOCUMENTS

| DE | 10 2004 052 489 A1 | 5/2006 |
| DE | 10 2005 044 880 A1 | 4/2007 |
| EP | 1 248 081 A1 | 10/2002 |
| EP | 1 396 707 A1 | 3/2004 |
| EP | 1 780 518 A2 | 5/2007 |
| EP | 1 783 464 A2 | 5/2007 |
| EP | 1 840 528 A2 | 10/2007 |

* cited by examiner

*Primary Examiner* — Jewel V Thompson
(74) *Attorney, Agent, or Firm* — Bacon & Thomas, PLLC (57) ABSTRACT

An sensor of a measuring system for determining and/or monitoring the flow of a measured medium through a measuring tube, wherein the ultrasonic sensor is seated in a shiftable manner in a sensor housing parallel to a first inner surface of the sensor housing. The ultrasonic sensor has a coupling element and an electromechanical ultrasound transducer element, wherein the ultrasonic sensor can, at least at times, at least partially, lie against the first inner surface of the sensor housing, and that a guide hanger at least partially lies against a second inner surface of the sensor housing lying opposite the first inner surface, wherein the ultrasonic sensor is seated in a shiftable manner essentially perpendicularly to the first inner surface in the guide hanger, and wherein a spring between the guide hanger and ultrasonic sensor acts essentially perpendicularly to the first inner surface.

12 Claims, 5 Drawing Sheets

ULTRASONIC SENSOR OF A MEASURING SYSTEM FOR DETERMINING AND/OR MONITORING FLOW OF A MEASURED MEDIUM THROUGH A MEASURING TUBE

TECHNICAL FIELD

The present invention relates to an ultrasonic sensor of a measuring system for determining and/or monitoring flow of a measured medium through a measuring tube, wherein the ultrasonic sensor is seated in a shiftable manner in a sensor housing, parallel to a first inner surface of the sensor housing, and wherein the ultrasonic sensor has a coupling element and an electromechanical ultrasonic transducer element.

BACKGROUND DISCUSSION

Ultrasonic flow measuring devices are often applied in process and automation technology. They permit volume flow and/or mass flow in a pipeline to be determined in a simple manner.

Known ultrasonic flow measuring devices frequently work according to the Doppler principle or according to the travel time difference principle.

In the travel time difference principle, the different travel times of ultrasonic pulses are evaluated relative to the flow direction of the liquid.

For this, ultrasonic pulses are sent at a particular angle to the tube axis both in the direction of the flow as well as also counter to the flow. From the travel-time difference, the flow velocity, and therewith, in the case of a known diameter of the pipeline section, the volume flow, can be determined.

In the Doppler principle, ultrasonic waves with a particular frequency are coupled into the liquid, and the ultrasonic waves reflected by the liquid are evaluated. From the frequency shift between the in-coupled and reflected waves, the flow velocity of the liquid can likewise be determined.

Reflections in the liquid occur, however, only when small air bubbles or impurities are present, so that this principle is mainly put to use in the case of contaminated liquids.

The ultrasonic waves are produced and received with the assistance of so-called ultrasonic sensors. For this, such are fixedly placed on the tube wall of the relevant pipeline section. More recently, clamp-on ultrasonic flow measuring systems are also obtainable. In the case of these systems, the ultrasonic sensors are only pressed onto the tube wall with a clamp. Such systems are known, for example, from EP 686 255 B1, U.S. Pat. No. 4,484,478 or U.S. Pat. No. 4,598,593.

A further ultrasound flow measuring device, which works according to the travel time difference principle, is known from U.S. Pat. No. 5,052,230. The travel time is, in this case, ascertained by means of short ultrasonic pulses.

A great advantage of clamp-on ultrasound flow measuring systems is that they do not contact the measured medium and they can be placed on an already existing pipeline. Disadvantageous is a high effort is needed when mounting the clamp-on systems to orient the individual ultrasonic sensors with respect to each other, such depending on many parameters, e.g. tube wall thickness, tube diameter, and velocity of sound in the measured medium.

The ultrasonic sensors normally comprise an electromechanical transducer, in industrial process measurements technology, most often a piezoceramic; and a coupling layer, also called a coupling wedge or, less frequently, a lead-in element. The coupling layer is, in such case, most often manufactured from synthetic material, e.g. plastic. In the electromechanical transducer element, the ultrasonic waves are produced, and led via the coupling layer to the tube wall, and from there, guided into the liquid. Since the velocities of sound in liquids and synthetic materials are different, the ultrasonic waves are refracted during the transition from one medium to another. The angle of refraction is determined in a first approximation according to Snell's law. The angle of refraction is thus dependent on the ratio of the propagation velocities in the media.

Between the piezoelectric element and the coupling layer, another coupling layer can be arranged, a so-called adapting or matching layer. The adapting or matching layer performs, in such case, the function of transmission of the ultrasonic signal, and simultaneously the reduction of reflection off interfaces between two materials caused by different acoustic impedances.

U.S. Pat. No. 6,397,683 B1 shows two clamp-on ultrasonic sensors which are securable on a pipeline by means of two affixing bands. For adjusting the spacing the two sensors, at least one sensor of the pipeline is to be loosened. Its affixing band is likewise to be loosened. Both of these are to be fixed anew after a new orienting. The coupling element of one of the ultrasonic sensors, together with the piezoelectric ultrasound transducer element placed on it, is seated resiliently in a housing.

U.S. Pat. No. 5,131,278 shows a possible embodiment for shiftably seating two ultrasonic sensors on a track, which is mountable fixedly on the measuring tube.

A track for the shiftable securement of ultrasonic sensors is likewise presented in EP 1 396 707 A1 and EP 1 840 528 A2. The sensors are, in such case, mounted resiliently in the track.

Described In EP 1 783 464 A2 is a guide frame as a sensor holding system, which is securable on the measuring tube by means of two securement systems. A housing is placed over this for protection of the sensors. For maintenance and for shifting the sensors, the housing must be removed.

All these documents share the common characteristic, that the sensors are shiftable during measurement operation. The holding apparatuses are, in such case, embodied in such a manner, that, after their securement on the measuring tube, the sensors are shiftable into the desired position. In order to protect the sensors from mechanical influences from outside, protective housings, in part to be applied separately, are provided. At the same time, the sensors are fixed in their measuring positions by additional mechanical components. These affixings are to be separately loosened, before an adjustment can be performed.

SUMMARY OF THE INVENTION

An object of the invention is to provide an ultrasonic sensor, whose position on a measuring tube is very easily and rapidly changeable.

The object is achieved by an ultrasonic sensor of a measuring system for determining and/or monitoring flow of a measured medium through a measuring tube, wherein the ultrasonic sensor is seated in a shiftable manner in a sensor housing parallel to a first inner surface of the sensor housing, and wherein the ultrasonic sensor has a coupling element and an electromechanical ultrasound transducer element, wherein the ultrasonic sensor can, at least partially, lie against the first inner surface of the sensor housing and wherein a guide hanger at least partially lies against a second inner surface of the sensor housing lying opposite the first inner surface. The ultrasonic sensor is seated in a shiftable manner essentially perpendicularly to the first inner surface in the guide hanger, wherein a spring between the guide hanger and ultrasonic sensor acts essentially perpendicular to the first inner surface.

The first and second inner surfaces of the sensor housing are, in such case, essentially perpendicular to one another. Through the spring, a force is thus exertable on the guide hanger and the ultrasonic sensor essentially in the direction perpendicular to the first and second inner surface of the sensor housing. The ultrasonic sensor is seated in a shiftable manner in the guide hanger essentially perpendicular to the first inner surface of the sensor housing. Thus, the ultrasonic sensor lies, in a first state, against the inner surface of the sensor housing, and, in a second state, especially in the case of compressed spring, the ultrasonic sensor does not contact the first inner surface of the sensor housing. The ultrasonic sensor can, consequently, at least at times, lie at least partially against the first inner surface of the sensor housing.

In an embodiment, the ultrasonic sensor is shiftable essentially along a line which is parallel to the first inner surface of the sensor housing. If the sensor housing is embodied in an elongated manner, this line extends in the direction of the longitudinal extension of the sensor housing.

In an embodiment of an ultrasonic sensor seated in the sensor housing in an axially shiftable manner, the ultrasonic sensor is guided in a groove, wherein the groove is made in the first inner surface of the sensor housing. The ultrasonic sensor is shiftable along this groove, wherein the ultrasonic sensor at least partially protrudes into the groove. The ultrasonic sensor forms a spring which fits into the groove, or the sensor itself forms the spring in the groove, which acts as a guide rail. Another embodiment provides that the ultrasonic sensor has a groove, and the first inner surface of the sensor housing has the spring.

The ultrasonic sensor is, in a further embodiment, surrounded in at least five spatial directions by the sensor housing.

In an advantageous further development of the ultrasonic sensor of the invention, the sensor housing has in its first inner surface a window, wherein the ultrasonic sensor at least partially protrudes into the window.

A very advantageous further development of the ultrasonic sensor of the invention provides that at least one part of the coupling element with an area for coupling the ultrasonic signals of the ultrasonic sensor in and/or out protrudes into the window. If the ultrasonic sensor with its coupling element protrudes partially into the window, and should the coupling element with its area for coupling the ultrasonic signals in and/or out be acoustically couplable with the measuring tube, the area for coupling the ultrasonic signals in and/or out lies at least in a plane with the outer surface of the sensor housing, wherein the outer surface, together with the first inner surface of the sensor housing, limits a part of a first sensor housing wall. In an embodiment, the coupling element with the area for coupling the ultrasonic signals in and/or out protrudes at least partially out of the sensor housing; the area for coupling the ultrasonic signals in and/or out protrudes beyond the outer surface of the sensor housing.

An advantageous further development of the ultrasonic sensor of the invention provides that the electromechanical ultrasound transducer element is larger than the area for coupling the ultrasonic signals of the ultrasonic sensor in and/or out, as projected perpendicularly to the ultrasound transducer element. The area of the ultrasound transducer element which is usable for conversion of ultrasonic signals into electrical signals and/or vice-versa, and which is perpendicular to the direction of the signal emission and/or radiation, is greater than the area for coupling the ultrasonic signals of the ultrasonic sensor in and/or out, as projected perpendicularly to the ultrasound transducer element.

Another advantageous further development of the ultrasonic sensor of the invention provides that the spring force of the spring is dimensioned in such a manner, that the ultrasonic sensor is manually shiftable.

If, for example, the ultrasonic sensor in its installed state is compressed a particular distance into the sensor housing in the direction of the second inner surface of the sensor housing, a certain first spring force $F1$ acts on the ultrasonic sensor. At the same time, this spring force acts on the second inner surface of the sensor housing via the guide hanger. The guide hanger and second inner surface of the sensor housing form a friction surface pair. The friction surface and the spring force are matched to one another in such a manner, that the ultrasonic sensor is not shiftable via a force to be applied manually or by a force that originates from vibrations of the measuring tube along the window. If, in this example of an embodiment, the sensor housing is, however, taken off of the measuring tube, the ultrasonic sensor is therefore not in the installed state, and if there are also no other forces applied to the ultrasonic sensor in the direction of and perpendicular to the second inner surface of the sensor housing, the ultrasonic sensor lies at least partially against the first inner surface of the sensor housing, and the spring applies a second force $F2$ different from the first force $F1$ to the ultrasonic sensor and the second inner surface of the sensor housing via the guide hanger abutting on this. $F2$ is smaller than $F1$. Now, the friction surface, that is, the friction surface pair of the guide hanger and second inner surface of the sensor housing. and the friction surface pair of ultrasonic sensor and first inner surface of the sensor housing, are matched to one another and with the spring force in such a manner, that the ultrasonic sensor is shiftable along the window via a force to be applied manually. It is also possible to match the friction surfaces named and the spring force in such a manner, that the ultrasonic transducer is also still shiftable in the case of a predeterminable compressing, and/or that the ultrasonic transducer, when lying against the first inner surface of the sensor housing, is not shiftable by a force which is brought about by vibrations or acceleration forces from poor handling of the sensor housing. Thus, for example, in this particular form of embodiment, the ultrasonic sensor should not be shiftable in the housing in the case of handling the sensor housing, e.g. during installation of the sensor housing or during maintenance tasks on the ultrasonic sensor.

Instead of designable friction surfaces, in an additional form of embodiment, at least partially and at least at times, interlocking cograils are provided. Thus, for example, on the area of the ultrasonic sensor lying opposite the first inner surface of the sensor housing, a provision of teeth are applied. A corresponding provision of teeth is located on the first inner surface of the sensor housing. If the ultrasonic sensor is pressed, e.g. manually, in the direction of the second inner surface of the sensor housing—thus in the direction of the interior surrounded by the sensor housing—the teeth on the two surfaces do not engage one another, and the ultrasonic sensor is shiftable parallel to the first inner surface of the sensor housing. If the pressure on the ultrasonic sensor is released again and the spring decompresses, the ultrasonic sensor is pressed in the direction of the first inner surface of the sensor housing, and the provision of teeth catch, this thus meaning that the ultrasonic sensor is secured against shifting parallel to the first inner surface of the sensor housing.

In an especially preferred embodiment of the invention, the spring force and the friction surface pairing formed from first inner surface of the sensor housing and area of the coupling element abutting thereon are designable in such a manner, that the ultrasonic sensor in the non-installed state is manually shiftable, and/or the spring force and the friction surface pairing formed from second inner surface of the sensor housing and area of the guide hanger abutting thereon are designable in such a manner, that the ultrasonic sensor in the non-installed state is not manually shiftable. The ultrasonic sensor is, for example, both in the installed state, as well as also in the non-installed state, securable in the sensor housing at least against a force of twice the acceleration of gravity times the weight of the ultrasonic sensor itself in the direction of an axial shifting in the sensor housing. In the installed state, the force, against which the sensor is securable, can also be far higher.

Another advantageous further development of the solution of the invention provides that the spring force of the spring is dimensioned in such a way, that the ultrasonic sensor is shiftable by means of a tool.

Analogous to the previous example of an embodiment, the ultrasonic sensor can be embodied so as to only be shiftable in the case of forces which, for example, are not appliable with mere manual force, but which, however, are appliable with a tool.

In an advantageous further development of the ultrasonic sensor of the invention, it is provided that the coupling element has lobes, wherein the lobes can lie against the first inner surface of the sensor housing.

Thus, for example, parts of the coupling shoe or the coupling element can in the non-installed state of the ultrasonic sensor lie on the housing interior formed by the first inner surface of the sensor housing. The lobes thus define the surfaces, with which the coupling element lies against the first inner surface and, thus, rubs thereon. These friction surface pairs are, in turn, designable in the previously described manner.

In the case of an additional advantageous further development of the invention, the sensor housing has on an outer surface of the sensor housing, which outer surface, together with the first inner surface of the sensor housing, limits a part of the sensor housing wall, a seal and at least one stop, wherein the stop, in the installed state of the ultrasonic sensor, can lie against a measuring tube and defines between the sensor housing and measuring tube a distance h, up to which distance h the seal between the sensor housing and measuring tube is compressable.

The sensor housing comprises, for example, a tubular middle part, e.g. a square or rectangular tube, with initially open ends. These ends are sealed by end caps. The end caps extend a small distance beyond the outer surface of the sensor housing facing the measuring tube in the installed state. Thus, the end caps form the stop which, in the installed state, lies against the measuring tube, and defines the distance h between the measuring tube and the side of the sensor housing facing measuring tube. The distance h thus corresponds to the length of the extension beyond the outer surface.

An alternative solution for forming the stop is presented by the ultrasonic sensors themselves. The sensors are seated resiliently in the sensor housing; they can thus be compressed in the direction of the interior of the sensor housing surrounded by the sensor housing. Thus, by limiting this compressing, a protrusion of the ultrasonic sensor beyond the side of the sensor housing facing the measuring tube in the installed state of the measuring system can be produced, wherein the protrusion especially has the predeterminable height h, and thus limits a pressing-in of the surrounding seal to h A very advantageous embodiment of the invention provides that a seal is arrangeable between the measuring tube and sensor housing, on the sensor housing wall facing the measuring tube. Usually, in the case of a clamp-on ultrasonic sensor, coupling grease is placed between ultrasonic sensor and measuring tube. This is, most often, not protected against weathering. Thus, measurement disturbances due to lacking or defective coupling grease can often occur, and the maintenance intervals can be very short. A seal between the sensor housing and measuring tube protects the coupling grease against drying out, evaporation, direct solar radiation, water or other weathering.

Preferably, the seal, as sealing lip, is placed around the window through which at least the first ultrasonic sensor protrudes. In such case, the most varied of embodiments and materials can be used. Any type of O-rings known to be used for sealing purposes can be used, or a simple layer of sealing silicone can be applied.

In an additional embodiment, the seal between the measuring tube and sensor housing is electrically conductive and/or electrically conductively coated. If the sensor housing is made from metal and/or is conductively coated, the ultrasonic sensor can receive electromagnetic disturbances from the outside through the window. If the measuring tube is likewise manufactured from metal and/or conductively coated, a better shielding against electromagnetic disturbances can be achieved with a conductive and/or conductively coated seal. In this regard, a synthetic material, e.g. plastic, seal could be conductively coated, e.g. with a spray. Equally, a plastic measuring tube can, at least on the area surrounded by the seal, be electrically conductively coated. Together with the likewise conductive and/or conductively coated sensor housing, a Faraday cage is thus formed.

In an additional advantageous further development of the solution of the invention, the sensor housing includes on the outer surface of the sensor housing, which outer surface, together with the first inner surface of the sensor housing, limits a part of the sensor housing wall, at least one stop, wherein the stop, in the installed state of the measuring system, can lie against a measuring tube, and defines between the sensor housing wall and measuring tube a distance h, up to which distance h the part of the coupling element with the area for coupling the ultrasonic signals of the ultrasonic sensor in and/or out protrudes out of the sensor housing in the installed state. If the sensors in the non-installed state lie with a distance larger than h beyond the side of the sensor housing facing the measuring tube in the installed state of the measuring system, the protrusion in the installed state of the measuring system can then be limited to the height h of the stop, which, for example, is formable from at least one end cap of the sensor housing, and, in the installed state, lies against the measuring tube.

Additionally, the object on which the invention is based is achieved by a measuring system having at least one ultrasonic sensor of the invention and at least one control/evaluation unit, which, on the basis of ultrasound measurement signals, or on the basis of measurement data which are derived from the ultrasound measurement signals, ascertains the volume flow and/or the mass flow of the measured medium flowing in the measuring tube, wherein the flow is ascertainable with a travel-time difference method or Doppler method.

In an advantageous further development of the measuring system of the invention, the ultrasonic sensor is orientable and securable on the measuring tube by means of a sensor holder.

BRIEF DESCRIPTION OF THE DRAWINGS

The invention will now be explained in greater detail on the basis of the appended drawing, the figures of which show as follows.

DETAILED DISCUSSION IN CONJUNCTION WITH THE DRAWINGS

Figure 1:
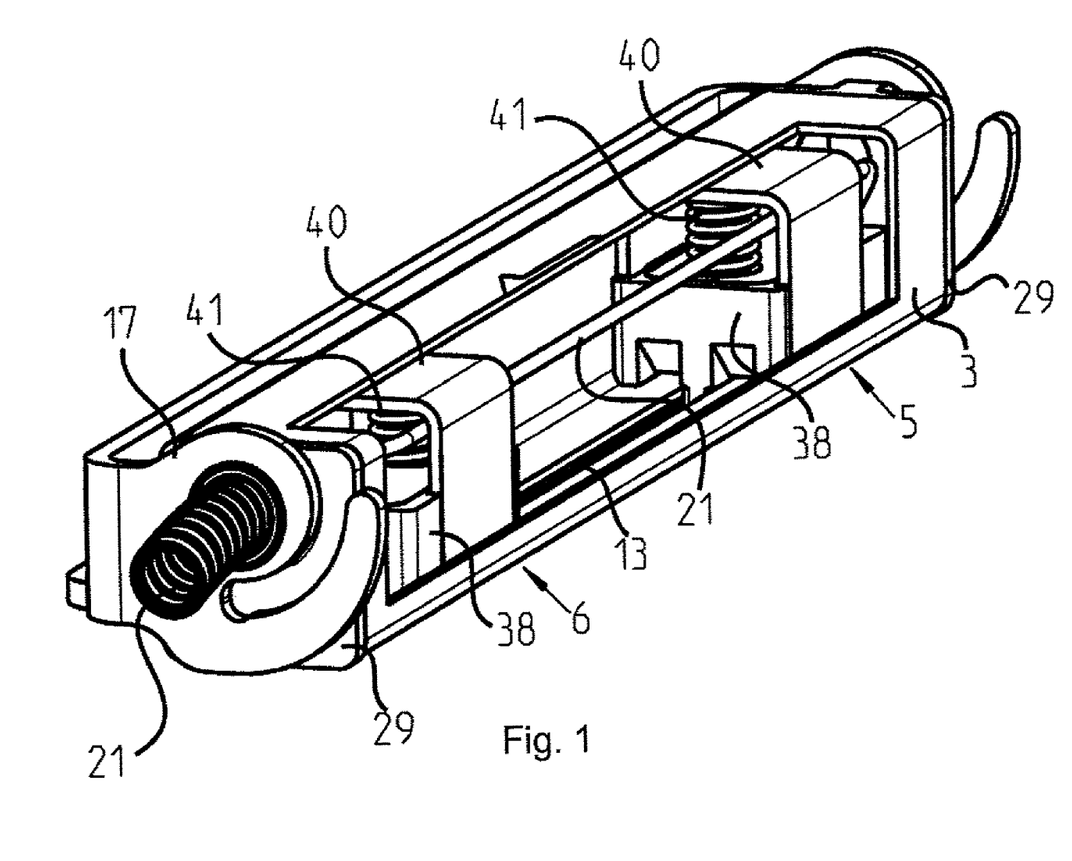
FIG. 1 shows in partial section, an ultrasonic sensor of the invention.

In FIG. 1, an ultrasonic sensor housing 3 of the invention is presented perspectively. Housing 3 accommodates two ultrasonic sensors 5, 6 wherein the first ultrasonic sensor 5 is seated shiftably in the housing 3. The sensor housing 3 is partially sectioned. Shown are the coupling elements 38 of the two ultrasonic sensors 5, 6, the guide hangers 40 and the springs 41 placed between the coupling elements 38 and guide hangers 40. The displaceable first ultrasonic sensor 5 is guided in the window 13 in the sensor housing 3. Window 13 extends in the longitudinal direction of the elongated sensor housing 3. Ultrasonic transducer 5 is accordingly shiftable in the longitudinal direction of the sensor housing 3. The square or rectangular tube shaped sensor housing 3 is closed off by end caps 29. These end caps 29 extend a distance h beyond the outer surface 12 of the sensor housing, and thus form the stop 15, as is to be seen in FIG. 2. Besides the already described features, a connection cable 21 extends within the sensor housing 3 and out of the sensor housing 3. Signals are fed therewith to or from the electromechanical transducer elements. By means of a clamping hanger 17, which is part of a securement mechanism, the sensor housing 3 is clampable on a measuring tube.

Figure 2:
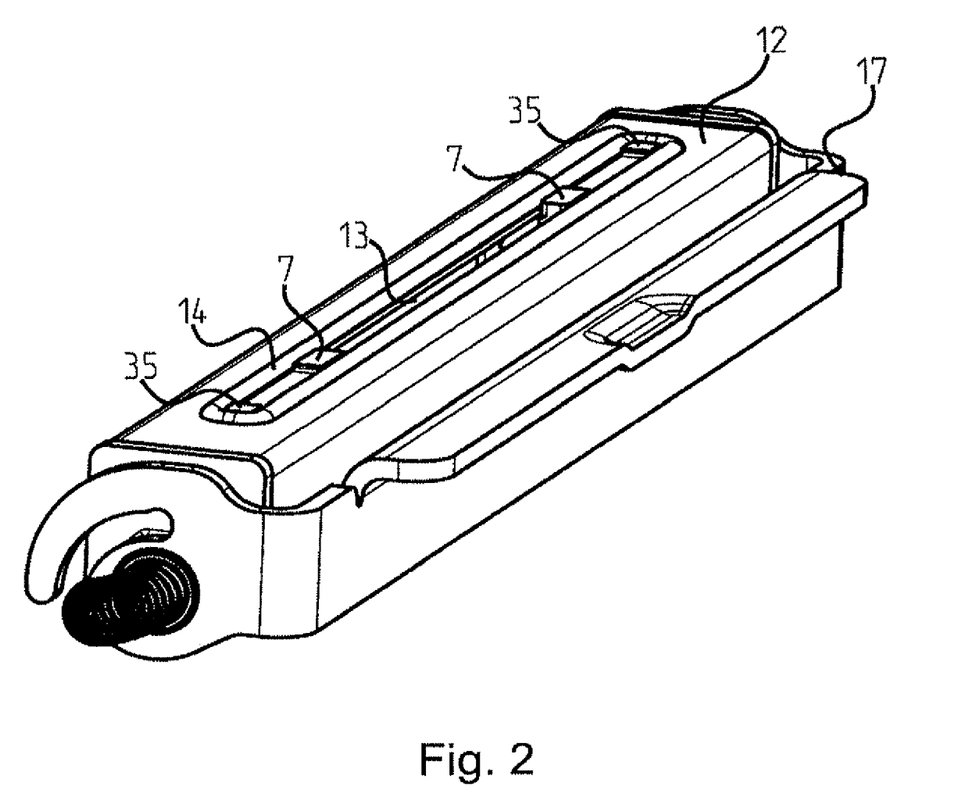
FIG. 2 shows perspectively, an ultrasonic sensor of the invention.

The interior of the sensor housing 3 is accessible to the user only via the window 13, as illustrated in FIG. 2. Aside from the window 13, the interior of the housing is sealed to the outside. Sensor housing 3 is mounted with the first sensor housing wall, i.e. the outer surface 12 in the direction measuring tube 2, to a sensor holder 4. In such mounted state of the measuring system 1, window 13 becomes sealed to the outside, so that the sensors 5, 6 can then no longer be reached by the user. Then, a shifting of the ultrasonic sensors 5, 6 with their sensitive surfaces 7 for coupling sound in and out is no longer possible on the measuring tube 2, this meaning that surfaces 7 are then safe against mechanical damage from the surroundings, e.g. safe from scratching.

Figure 3:
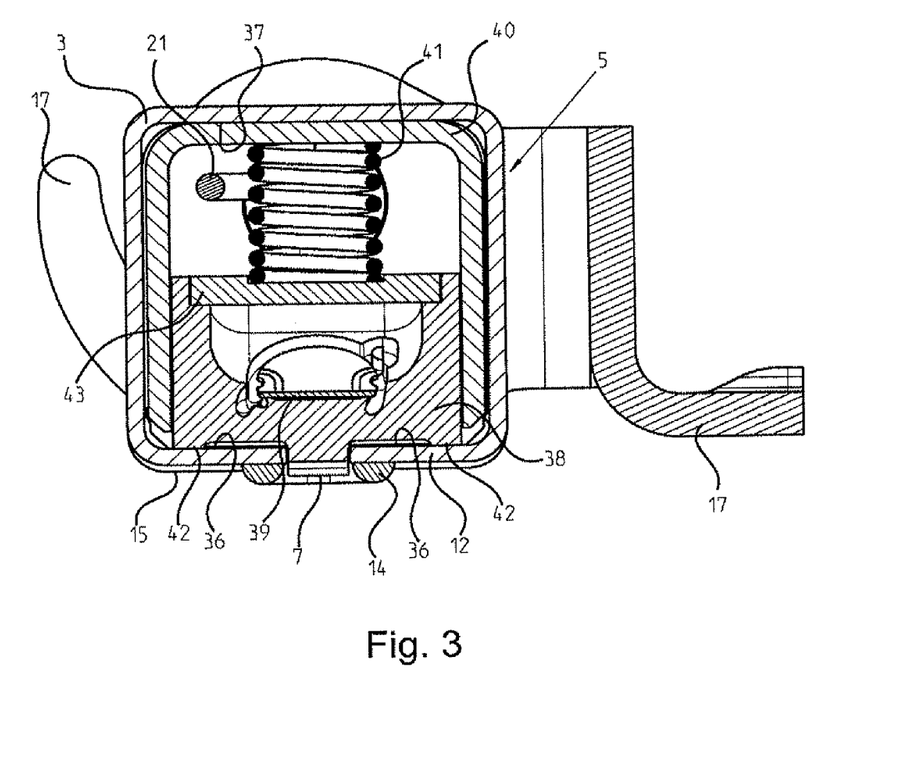
FIG. 3 shows an ultrasonic sensor of the invention in cross section.

FIG. 3 shows the ultrasonic sensor 5 in cross section. The sensor housing 3 surrounds the ultrasonic sensor 5. The coupling element 38 includes an area 7 for coupling ultrasonic signals in and out. A part of the coupling element 38 protrudes into the window 13 of the sensor housing and is guided by the window, wherein the area 7 for coupling ultrasonic signals in and out protrudes out of the window and stands above the outside 12 of the sensor housing 3. Window 13 is surrounded on the outside 12 of the sensor housing by a seal 14. Both the seal 14 as well as the part of the coupling element 38 which protrudes out of the window stand above the height of the stop 15 in the direction away from the outer surface 12 of the sensor housing. Outside of the sensor housing 3, a clamping hanger 17 is mounted so as to be rotatably seated on the sensor housing 3.

In the sensor housing 3, the coupling element 38 is seated shiftably in a guide hanger 40. The coupling element 38 lies with its lobes 42 against the first inner surface 36 of the sensor housing 3. Guide hanger 40 lies against the second inner surface 37 of the sensor housing. Therebetween, a spring 41 is placed. Spring 41 is connected on one side with the guide hanger 40, and on the other side with the lid 43 of the coupling element 38. The ultrasonic sensor 5 is embodied in such a manner, that it is shiftable in and out of the plane of the drawing, that is, in the longitudinal direction of the sensor housing 3. If the ultrasonic sensor 5 is shifted in the direction of the interior of the sensor housing 3, the spring correspondingly compresses. The lobes 42 of the coupling element 38 separate from the first inner surface 36 of the sensor housing, as the coupling element 38 shifts in the guide hanger 40 in the direction of the second inner surface 37 of the sensor housing 3. Then, the friction between the lobes 42 and first inner surface 36 of the sensor housing 3 is lost, and the ultrasonic sensor 5 can be shifted in the longitudinal direction of the sensor housing 3. When sensor 5 is at the desired position, and when the pressure on the coupling element 38 in the direction of the second inner surface 37 of the sensor housing 3 is released, spring 41 decompresses, and the now-restored friction between the lobes 42 and the first inner surface 36 of the sensor housing 3 secures the ultrasonic sensor against additional shifting in the longitudinal direction of the sensor housing. Lid 43 of the coupling element 38 serves, on the one hand, for connecting the spring with the coupling element, and, on the other hand, for protecting and/or shielding the electromechanical transducer element. Electrical connecting cables 21 are led in the sensor as indicated.

Figure 4:
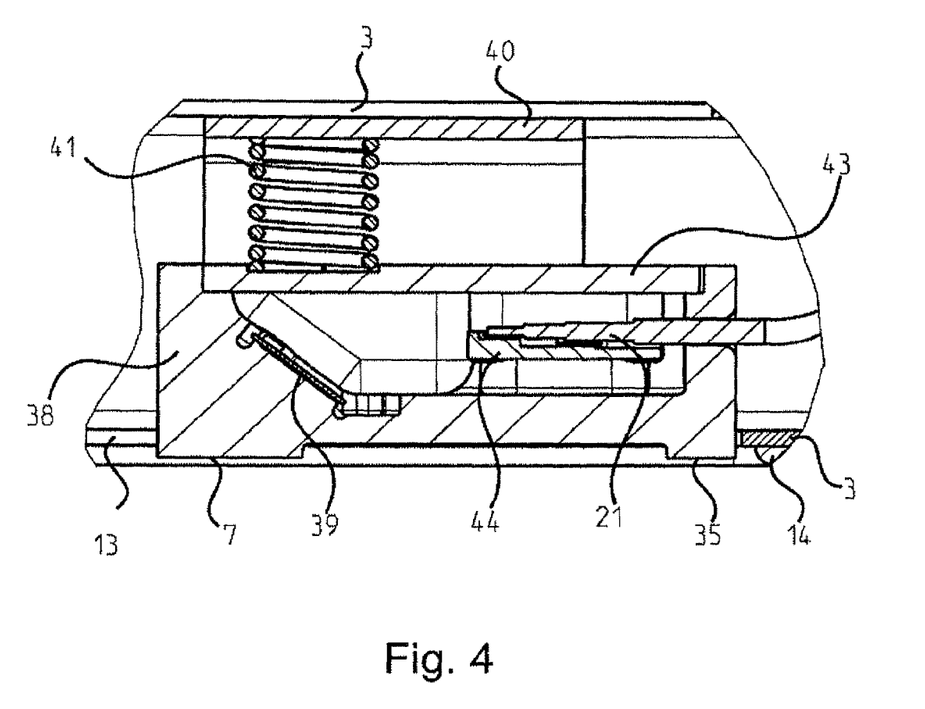
FIG. 4 shows an ultrasonic sensor of the invention in longitudinal section.

FIG. 4 shows the ultrasonic sensor 5 in longitudinal section. The support surface 35 is coplanar with the surface 7 for coupling sound in or coupling sound out. In the installed state, the two surfaces 7, 35 are in contact with the measuring tube 2. The area of the electromechanical transducer 39, here a piezoelectric element, is greater than the area 7 for coupling the ultrasonic signals of the ultrasonic sensor 5 in and/or out projected perpendicularly onto the ultrasonic transducer element 39.

Figure 5:
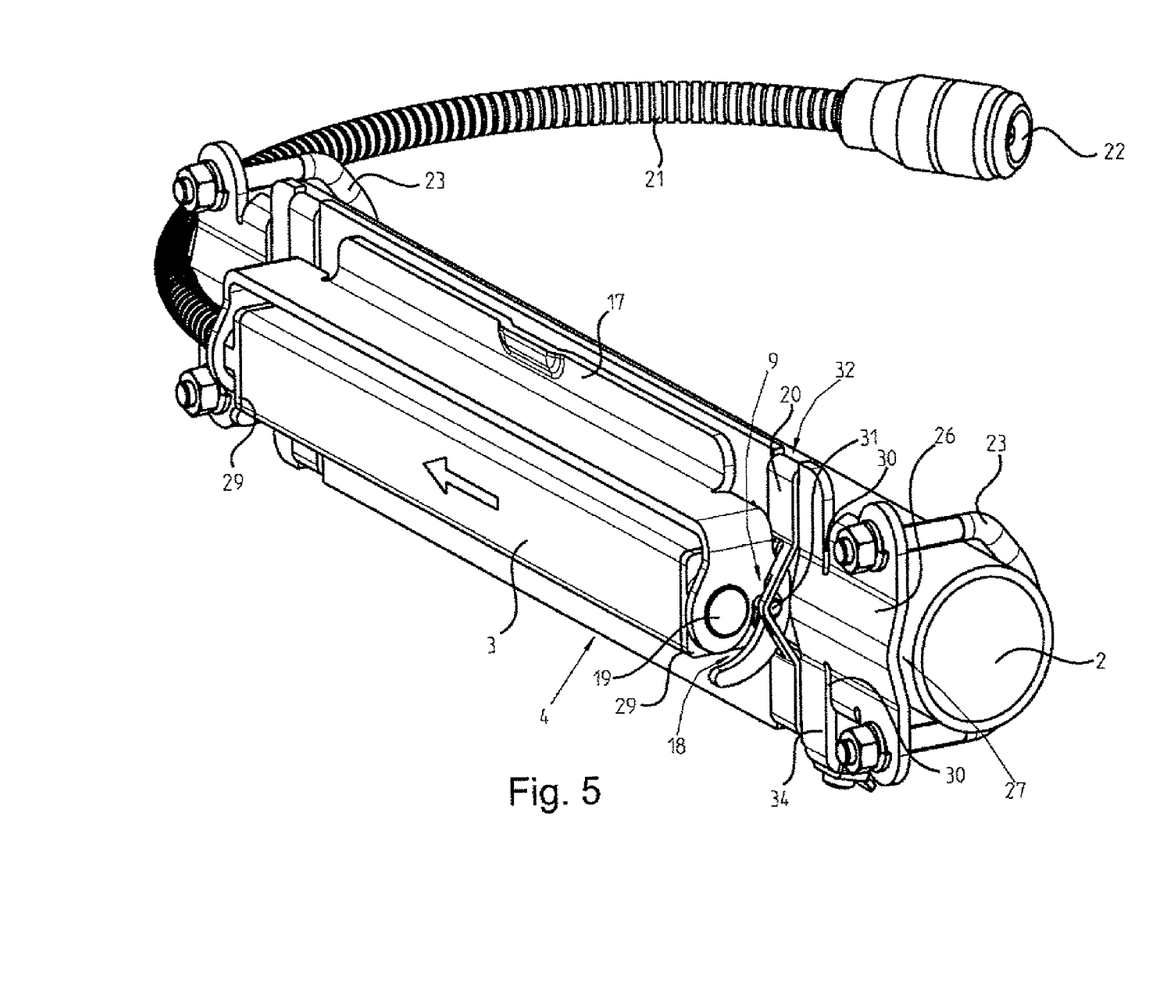
FIG. 5 shows perspectively, a measuring system of the invention installed on a measuring tube.

FIG. 5 depicts a measuring system 1 with the ultrasonic sensor 5 of the invention in the installed state on a measuring tube 2. Measuring system 1 comprises a sensor housing 3 and a sensor holder 4. The ultrasonic sensors are surrounded by the sensor housing 3 and lie with their surfaces for coupling sound in or out on the measuring tube. Therefore, they are not seen in this drawing. This shows, however, that the ultrasonic sensors are not accessible to the user from the outside, and are therewith not shiftable, and that they are well-protected against mechanical influences from the outside. Leading away from the sensor housing 3 is a connection cable 21 with a connection plug 22 for connection of the ultrasonic sensors to a control/evaluation unit. The control/evaluation unit itself is not shown. The sensor holder 4 is tightly clamped with U-bolts 23 onto the measuring tube 2. The U-bolts 23 can be made of elastic material with a spring action, or, as presented here, from a relatively form-stable steel. They are connected via screw connections with the sensor holder 4.

Through the special design of the sensor holder 4, the measuring tube 2 is not deformed by the necessary clamping force of the U-bolts 23. The sensor holder 4 is embodied as a metal securement sheet 26, which has a slit 30 for force isolation between a region for accommodating the sensor housing 3 and a region 32 for accommodating the securement means. The securement means comprise the U-bolts 23. The regions 32 for accommodating the securement means have bores for securement of the U-bolts, and guides 34 for guiding the clamping bands. Both regions enable the securement of the metal securement sheet 26 on the measuring tube by means of certain forces. The regions protrude, in such case, somewhat out from the surfaces of the sensor holder 26 abutting on the measuring tube 2, i.e. the edges of the clamping band guides 34 and the bores for accommodating the U-bolt 23 do not contact the measuring tube 2, and offer, consequently, a certain spring action. Thus, for example, forces which could deform the pipe, which, for example, are erroneously applied during installation via the tightening torque of the U-bolts 23 or the tension of the clamping bands, are absorbed by the metal securement sheet and, consequently, only transmitted to the pipe in a lessened degree. The metal securement sheet 26 offers a certain flexibility and elasticity. By the slits 30, this elasticity is, on the one hand, increased, and, on the other hand, the forces for securement of the sensor holder 26 to the measuring tube 2 are decoupled from the securement mechanism for securement of the sensor housing to the measuring tube 2. The slits 30 extend, in such case, preferably from the edges of the metal securement sheet up to the surfaces of the metal securement sheet in contact with the measuring tube 2.

Additionally, the metal securement sheet 26 includes, besides the prismatic cavity 27, which serves as a first functional surface for orientation of the sensor holder 4 or of the metal securement sheet 26 on the measuring tube 2, a second functional surface for orientation of the sensor housing 3 on the sensor holder 4 or on the measuring tube 2. The sensor housing 3 is emplaced between lateral straps of the metal securement sheet 26 as the second functional surface. Through a window in the sensor holder 26 which lies between the lateral straps, the sensor housing 3 comes in contact with the measuring tube 2. Via a leaf spring 20 with a pin 31, the sensor housing 3 is secured on the metal securement sheet 26. The leaf spring 20 with the pin 31 forms the first part of the securement mechanism 9. The clamping hanger 17 placed rotatably on the sensor housing 3 is a further part of the securement mechanism 9. The leaf spring 20 can, in such case, be an integral component of the sensor holder, or, as is the case here, be a part secured onto the metal securement sheet 26. The pin 31 is, in this case, likewise connected with the leaf spring 20 in a material-bonded, shape-interlocking or force-retaining (e.g. frictionally) manner.

The sensor housing 3 and sensor holder 4 are embodied in such a manner, that the sensor housing 3 is orientable toward the measuring tube 2 and releasably fixable in the sensor holder 4. For this purpose, the sensor housing 3 is inserted into a window between the lateral straps of the sensor holder 4. The clamping hanger 17 is, in such case, in the start position. By rotating the clamping hanger 17 to the end position, the clamping hanger 17 engages with its eccentric cutout 18 into the leaf spring 20 with the pin 31. The eccentric cutout 18 is thus guided around the pin 31. Through the eccentricity of the cutout 18, upon the rotation of the clamping hanger 17, the sensor housing 3 is drawn in the direction of measuring tube 2, and thus pressed onto the measuring tube 2. In such case, the seal is compressed to the height h of the stop, this thus meaning that it seals the sensor housing 3 against the measuring tube 2, and the ultrasonic sensors 5, 6, which in the non-installed state protrude out of the sensor housing 3 beyond the height h, are likewise shifted into the sensor housing 3 to the height h of the stop, with which they protrude in the installed state beyond the sensor housing wall 12. The sensor housing 3 here comprises a square or rectangular tube with end caps 29, which close the square or rectangular tube on its ends. The end caps 29 extend here somewhat over the side of the first sensor housing wall 12, and thus form a stop with the height h. If the sensor housing 3 is pressed onto a measuring tube 2, the end caps 29, i.e. the stops, come directly in contact with the measuring tube 2. The sensor housing wall 12 facing the measuring tube is, thus, spaced a distance h from measuring tube.

Before applying the sensor housing 3, a coupling mat (not shown) is placed between the sensor housing 3 and the measuring tube 2, or coupling grease is placed between the sensor housing 3 and measuring tube 2. Through the elastic effect of the leaf spring 20, the sensor housing 3 is releasably fixed on the measuring tube with a predetermined force, and assures the lying of the sensor housing 3 against the measuring tube 2. At the same time, the sensor holder 4, as a metal securement sheet 26, is equipped with slits 30, so that the forces with which the metal securement sheet 26 is held on the measuring tube 2 are decoupled from the securement mechanism 9 of the sensor housing 3 on the metal securement sheet 26 or on the measuring tube 2. Through the shape of the eccentric cutout 18 in the clamping hanger, the elastic securement of the sensor housing 3 on the sensor holder 4 or on the measuring tube 2 is self-locking.

Besides the securement mechanism 9 with the illustrated clamping hanger 17, which, together with the leaf spring 20, forms the securement mechanism 9, other securement mechanisms 9 can be used. Thus, the sensor housing can, for example, be secured to the measuring tube by means of elastic clamping bands or the securement occurs by means of magnets on the sensor holder.

LIST OF REFERENCE CHARACTERS 1 flow measuring system
2 measuring tube
3 sensor housing
4 sensor holder
5 first ultrasonic sensor
6 second ultrasonic sensor
7 surface, area for ultrasound coupling in/out
8 control/evaluation unit
9 securement mechanism
10 first functional surface
11 second functional surface
12 first sensor housing wall
13 window in the sensor housing
14 seal
15 stop
16 window in the sensor holder
17 clamping hanger
18 eccentric cutout of the clamping hanger
19 rotation axis of the clamping hanger
20 leaf spring with pin
21 connection cable
22 connection plug
23 U-bolt
24 clamping band
25 measured medium
26 metal securement sheet
27 prismatic cavity
28 lateral straps
29 end cap
30 slit in the metal securement sheet
31 pin in the leaf spring
32 region for accommodating the securement means
33 bore
34 clamping band guide
35 support surface
36 first inner surface of the sensor housing
37 second inner surface of the sensor housing
38 coupling element 39 electromechanical transducer element
40 guide hanger
41 spring
42 lobes
43 lid of the coupling element
44 connector board

The invention claimed is:

1. An ultrasonic sensor of a measuring system for determining and/or monitoring the flow of a measured medium through a measuring tube, comprising:
a sensor housing having a first inner surface and a second inner surface lying opposite to said first inner surface;
a coupling element;
an electromechanical ultrasound transducer element; a guide hanger; and
a spring, wherein:
the ultrasonic sensor can, at least partially, lie against said first inner surface of said sensor housing, and that a guide hanger at least partially lies against said second inner surface of said sensor housing;
the ultrasonic sensor is seated in said guide hanger in a shiftable manner essentially perpendicularly to said first inner surface; and
said spring between said guide hanger and the ultrasonic sensor acts essentially perpendicularly to said first inner surface.

2. The ultrasonic sensor as claimed in claim 1, wherein:
said sensor housing has a window in said first inner surface; and
the ultrasonic sensor at least partially protrudes into said window.

3. The ultrasonic sensor as claimed in claim 2, wherein:
at least one part of said coupling element protrudes into said window with an area for coupling ultrasonic signals of the ultrasonic sensor in and/or out.

4. The ultrasonic sensor as claimed in claim 3, wherein:
said electromechanical ultrasound transducer element is larger than said area for coupling the ultrasonic signals of the ultrasonic sensor, as projected perpendicularly to said ultrasound transducer element.

5. The ultrasonic sensor as claimed in claim 1, wherein:
the spring force of said spring is sized in such a manner that the ultrasonic sensor is manually shiftable.

6. The ultrasonic sensor as claimed in claim 1, wherein:
the spring force of said spring is sized in such a manner that the ultrasonic sensor is shiftable by means of a tool.

7. The ultrasonic sensor as claimed in claim 1, wherein:
said coupling element has lobes, which can lie against said first inner surface of said sensor housing.

8. The ultrasonic sensor as claimed in claim 2, wherein:
said sensor housing has on an outer surface which outer surface, together with said first inner surface, limits a part of said sensor housing wall, a seal and at least one stop;
said stop, in an installed state of the ultrasonic sensor, can lie against a measuring tube and defines between said sensor housing and the measuring tube a distance h, up to which distance h said seal between said sensor housing and the measuring tube is compressable.

9. The ultrasonic sensor as claimed in claim 3, wherein:
said sensor housing has on an outer surface, which outer surface, together with said first inner surface limits a part said sensor housing wall, at least one stop, said stop, in an installed state of the ultrasonic sensor, can lie against a measuring tube and defines between said outer surface of said sensor housing wall and the measuring tube a distance h, up to which distance h the part of said coupling element with said area for coupling the ultrasonic signals of the ultrasonic sensor in and/or out protrudes in the installed state out of said sensor housing.

10. A measuring system comprising:
at least one ultrasonic sensor of a measuring system for determining and/or monitoring the flow of a measured medium through a measuring tube, comprising:
a sensor housing having a first inner surface and a second inner surface lying opposite to said first inner surface;
a coupling element;
an electromechanical ultrasound transducer element; a guide hanger; and
a spring, wherein:
the ultrasonic sensor can, at least partially, lie against said first inner surface of said sensor housing, and that a guide hanger at least partially lies against said second inner surface of said sensor housing;
the ultrasonic sensor is seated in said guide hanger in a shiftable manner essentially perpendicularly to said first inner surface; and
said spring between said guide hanger and the ultrasonic sensor acts essentially perpendicularly to said first inner surface;
and at least one control/evaluation unit, which, based on ultrasound measurement signals, or based on measurement data derived from the ultrasound-measurement signals, ascertains volume flow and/or mass flow of the measured medium flowing in the measuring tube, wherein:
the flow is ascertainable with a travel time difference method or a Doppler method.

11. The measuring system as claimed in claim 10, wherein:
said sensor housing is orientable with respect to, and securable to, the measuring tube by means of a sensor holder.

12. The measuring system as claimed in claim 10, wehrein:
said sensor housing surrounds at least two ultrasonic sensors; and
at least the first ultrasonic sensor is seated in a shiftable manner in said sensor housing.

* * * * *